United States Patent [19]

Zeller, Jr.

[11] Patent Number: 4,668,902

[45] Date of Patent: May 26, 1987

[54] APPARATUS FOR OPTIMIZING THE CHARGING OF A RECHARGEABLE BATTERY

[75] Inventor: David A. Zeller, Jr., Brookfield, Conn.

[73] Assignee: ITT Corporation, New York, N.Y.

[21] Appl. No.: 849,654

[22] Filed: Apr. 9, 1986

[51] Int. Cl.⁴ .......................... H02J 7/04; H02J 7/10; H01M 10/44
[52] U.S. Cl. ........................................ 320/31; 320/2; 320/35
[58] Field of Search ................... 320/2, 17, 18, 15, 35, 320/36, 3-5, 31

[56] References Cited

U.S. PATENT DOCUMENTS

| | | | |
|---|---|---|---|
| 3,312,889 | 4/1967 | Gold | 320/36 |
| 3,421,068 | 1/1969 | Van Marter | 320/35 X |
| 3,484,659 | 12/1969 | Nagai et al. | 320/2 X |
| 4,163,186 | 7/1979 | Haley | 320/2 X |

*Primary Examiner*—R. J. Hickey
*Attorney, Agent, or Firm*—Robert A. Hays; Peter C. Van Der Sluys

[57] ABSTRACT

An apparatus for optimizing the charging of a rechargeable battery includes, in parallel with the rechargeable battery, a series of diodes selected to exhibit an effective impedance that is the inverse of the impedance of the rechargeable battery regardless of the ambient temperature.

12 Claims, 5 Drawing Figures

APPARATUS FOR OPTIMIZING THE CHARGING OF A RECHARGEABLE BATTERY

BACKGROUND OF THE INVENTION

The present invention generally relates to an apparatus for optimizing the charging of a rechargeable battery and, in particular, relates to one such apparatus having means for providing a current path for current from a recharging current source when the battery is recharged regardless of the ambient temperature.

Rechargeable batteries have long been employed to avoid the expense of replacing discharged batteries. One of the most common rechargeable batteries is that used in an automobile. The automobile battery, as generally known, is recharged via current supplied from the automobile's generator when the engine is running. When the automobile battery is fully charged a relay, or similar switching device, causes the current flow to the battery to be terminated. The use of a rechargeable battery in an automobile, however, is not only a rather specialized application but also a well defined application wherein, for example, the battery is readily available for external recharging or replacement if the battery is unintentionally fully discharged.

Other, more generalized, applications for rechargeable batteries involve conditions where there is a wide variation in the ambient temperature, where the ability to service such a battery in person is prohibitively expensive due, for example, to the sheer number of units involved or to the remote location thereof, or both. The provision and control of a generator for each, or even a reasonable number of such batteries, under such conditions would usually also be prohibitively expensive. Consequently, some other means must be provided to recharge such batteries.

One conventional solution is to provide a battery charger that operates from a source of electrically near the rechargeable battery, such as the local electrical power main. However, such battery chargers are rather complex constant current or constant voltage sources requiring switching circuitry to regulate and turn off the recharging current to the battery when it is recharged. Further, such battery chargers are usually not suitable for trickle charging a battery and do not compensate for changes in the ambient temperature of the battery. Further, conventional battery chargers are relatively easily bypassed, this is a major consideration when, for example, the battery is used to power a monitor for measuring a consumers use of a utility, such as, water or electricity. In addition, under such circumstances, the consumers would quite probably be very resistant to such an installation if they were to be billed for the power necessary to operate a utilities monitoring device.

Furthermore, due, to a large degree, to the variation of the charging characteristics of rechargeable batteries with changes in the ambient temperature thereof many such rechargeable batteries are frequently overcharged. Although overcharging a rechargeable battery at low currents, i.e., trickle charges, does not usually result in a catastrophic failure of the battery, it does, nevertheless, reduce the useful life of the battery. Over a period of time, such a decreased lifetime can be a significant cost consideration where the number of batteries involved is large.

Consequently, a simplified apparatus for optimizing the trickle charging of a rechargeable battery is highly desirable to both preserve the useful life of the rechargeable battery and to reduce the cost of such a recharging apparatus.

SUMMARY OF THE INVENTION

Accordingly, it is one object of the present invention to provide an apparatus for trickle charging a rechargeable battery that adjusts the charge limit voltage in accordance with the ambient temperature.

This object is accomplished, at least in part, by an apparatus having means, in parallel with the rechargeable battery, for providing a current path for the trickle charge current from a battery charging current source, the means effectively provides an impedance that varies inversely to the charge voltage of the rechargeable battery as the battery voltage increases with increasing charge, this variation in impedance being self-modifying with changes in ambient temperature to substantially follow the variation of charge voltage of the battery with ambient temperature whereby when the rechargeable battery reaches the fully charged voltage thereof substantially all of the current drawn from the battery charging current source flows through the current path providing means regardless of ambient temperature changes.

Other objects and advantages will become apparent to those skilled in the art from the following detailed description read in conjunction with the appended claims and the drawings attached hereto.

DETAILED DESCRIPTION OF THE INVENTION

Figure 1:
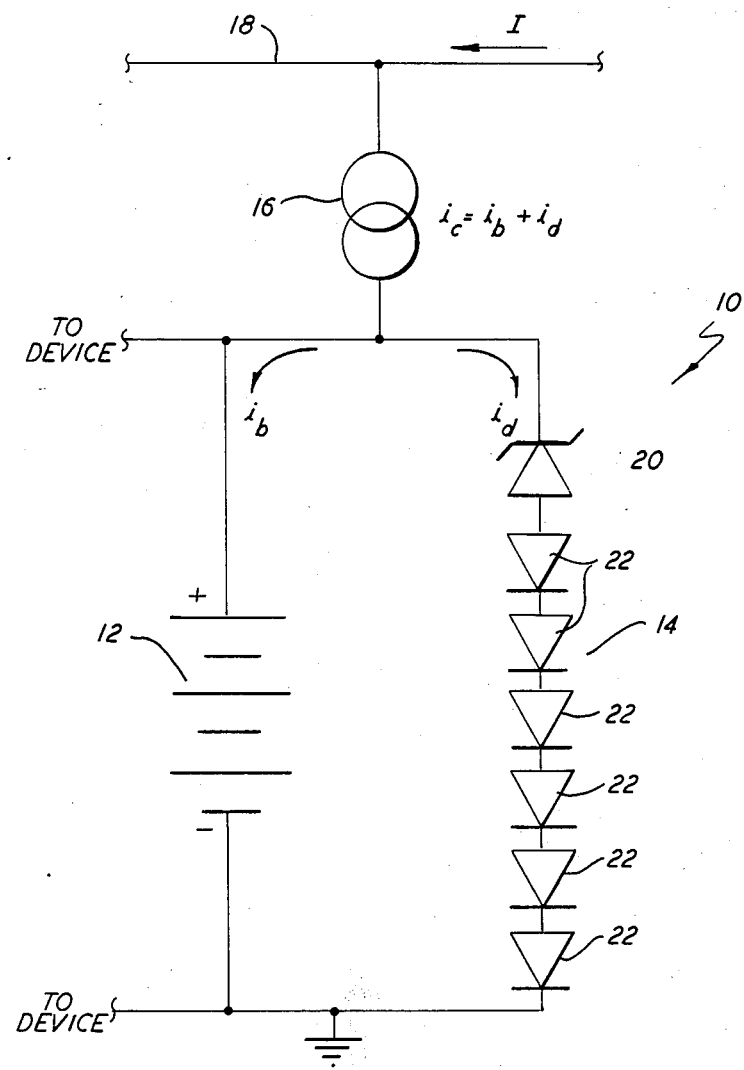
FIG. 1 is a schematic diagram of an apparatus embodying the principles of the present invention.

An apparatus, generally indicated at 10 in FIG. 1 and embodying the principles of the present invention, for recharging a rechargeable battery 12 includes a means 14 for providing an alternate current path for a trickle charge current. Preferably, the means 14 is electrically in parallel with the rechargeable battery 12 that is adapted to provide power to some device, not shown in the drawing. Further, in one preferred embodiment, the means 14 and the rechargeable battery 12 are commonly connected to a battery charging current source 16 adapted to provide a trickle charge current, $i_c$. In one particular application the current source 16 is, effectively, a current limiter and is connected to a line 18 that supports a continuous current, I, that is greater than the trickle charge current, $i_c$, required for trickle charging the rechargeable battery 12.

In the preferred embodiment, the means 14 is physically located such that it is subjected to the same ambient temperature as the rechargeable battery 12 and effectively exhibits a voltage threshold that varies in a similar manner to the fully charged voltage of the rechargeable battery 12 with changes of the ambient temperature. Further, in the preferred embodiment, the means 14 for providing the alternate current path for the trickle charge current, $i_c$, is adapted to draw a current, $i_d$, only after the rechargeable battery 12 has been substantially completely charged to a preselected voltage, for example, the fully charged voltage, by the current, $i_b$, drawn from the current source 16.

Ideally, the means 14 would be, for example, a single discrete semiconductor PN junction that is in parallel with and reverse biassed with respect to the rechargeable battery 12 and characterized by an abrupt reverse breakdown voltage about equal to the fully charged voltage of the rechargeable battery 12 while exhibiting a voltage versus temperature response identical to that of the rechargeable battery 12. However, such a PN junction is not presently readily available, if available at all. Further, to design and implement such an ideal semiconductor PN junction for each type of rechargeable battery would be prohibitively expensive and time consuming. This condition is particularly true when one considers the number of different rechargeable batteries available.

However, the means 14, in one particular implementation, closely approximates the above-described ideal operating conditions. More specifically, the means 14, in this implementation, includes a zener diode 20 in series with one, or more, forward diodes 22. The zener diode 20 is reverse biassed with respect to the rechargeable battery 12 whereas the forward diodes 22 are forward biassed.

In one particular implementation, the battery 12 to be recharged is a six (6) volt, three cell, lead-acid rechargeable battery 12, such as, for example, a CF6 V ½ manufactured and marketed by Eagle-Picher Industries, Inc. of Seneca, MO. In this embodiment, the zener diode 20 is a type IN5228 and the forward diodes 22 are type IN4148 diodes. All of these diodes, 20 and 22, are readily available as off-the-shelf devices. In fact, all of the diodes, 20 and 22, although designated as particular types, can be any combination of specific types selected to effectively have about the same cumulative voltage drop and voltage drop versus temperature variation as the rechargeable battery 12. The selection of a particular zener diode 20 and the type and number of forward diodes 22 should be selected to match with a particular trickle charge for the rechargeable battery 12 involved. Further, disregarding any leakage current, the voltage across the means 14 must be greater than the sum of the reverse breakdown voltage of the zener diode 20 plus the sum of the individual forward conduction voltages of the forward diodes 22 before any of the trickle charge current, $i_c$, can flow therethrough. This ensures that the rechargeable battery 12 is substantially completely fully recharged before any significant current flows through the means 14. These particular voltages can be readily ascertained from the operating curves of the individual diodes, 20 or 22.

Figure 2:
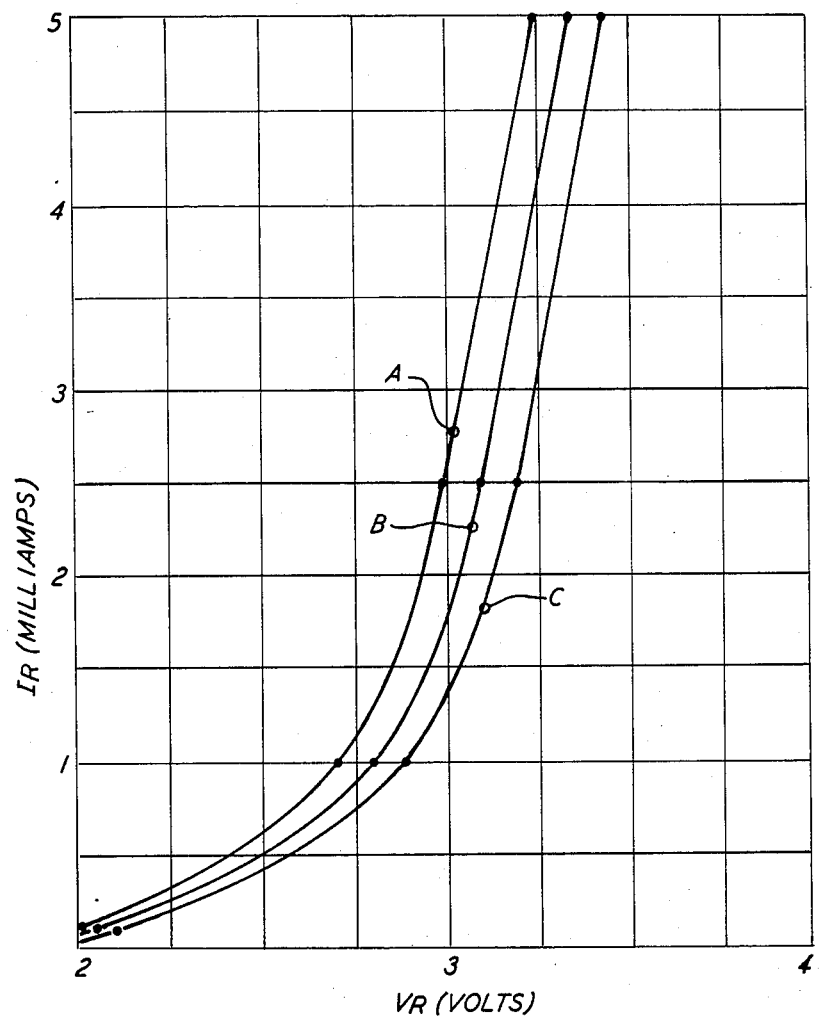
FIG. 2 is a graphic representation, now drawn to scale, of the operating characteristics of the reverse biassed diode of the apparatus shown in FIG. 1.

A typical reverse breakdown voltage versus current characteristic curve for a zener diode useful as the zener diode 20 is shown in FIG. 2. The three curves, A, B and C, represent the operating characteristics of the zener diode at three different temperatures, i.e., at 75° C., 25° C. and −25° C., respectively. Thus, at 25° C. the zener diode has a reverse breakdown voltage of about 3.1 volts at about 2.5 milliamps. Further, the reverse breakdown voltage varies at a rate of about −1.6 millivolt per degree Centigrade.

Figure 3:
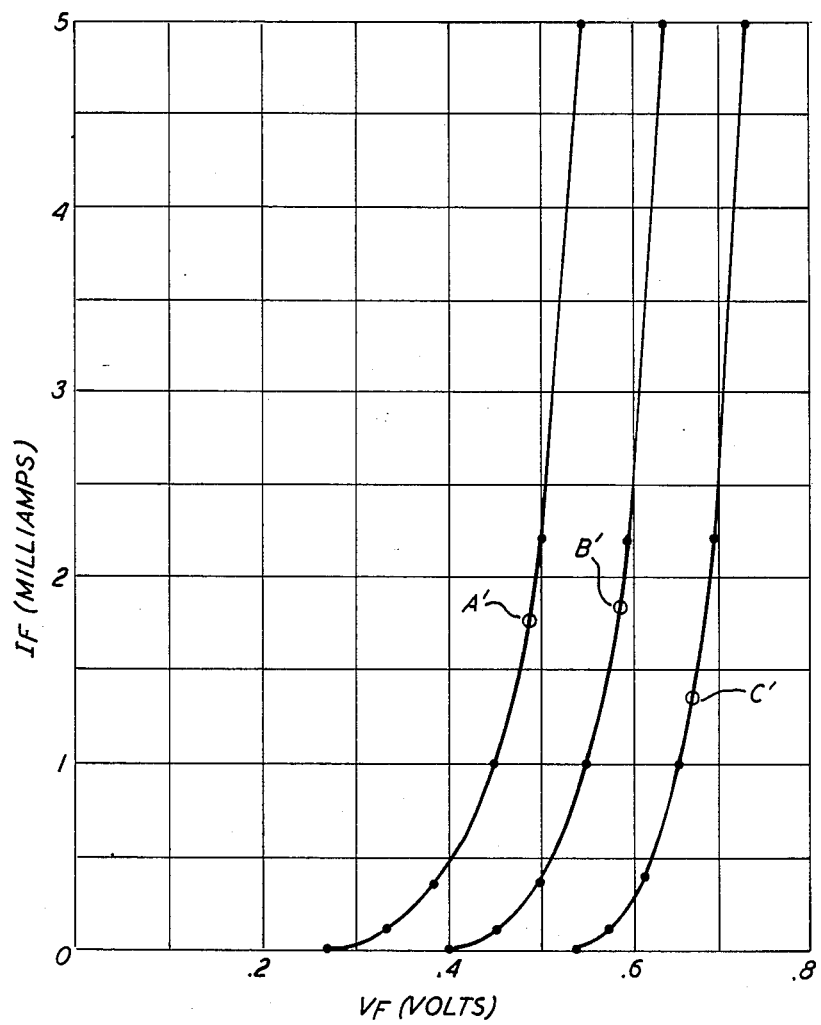
FIG. 3 is a graphic representation, not drawn to scale, of the operating characteristics of one of the forward biassed diodes of the apparatus shown in FIG. 1.

Similarly, a typical forward conduction voltage versus current characteristic curve for a forward diode useful as the forward diode 22 is shown in FIG. 3. Similar to the curves shown in FIG. 2, the three curves, A', B' and C', represent the operating characteristics of the forward diode at three different temperatures, i.e., at 75° C., 25° C. and −25° C., respectively. Thus, at 25° C. the forward conduction voltage of each diode 22 is about 0.6 volts at about 2.5 milliamps. Further, the forward conduction voltage of each diode 22 varies at a rate of about −1.9 millivolts per degree Centigrade.

Nominally, therefore, at 25° C. the means 14 conducts about 2.5 milliamps when the voltage of the battery 12 reaches about 6.7 volts. This voltage is determined by summing the 3.1 volts, for the zener diode 20, plus with (6), i.e., the total number of forward diodes in the means 14, times the 0.6 volts of each of the forward diodes 22. The fully charged voltage of the particular rechargeable battery 12 of this embodiment is nominally rated, at 25° C., at about 2.3 volts per cell and includes three (3) cells, i.e., about 6.9 volts. Hence, for a charging current $i_c$ of about 2.5 milliamps, the means 14 will draw substantially all of the charging current, $i_c$, when the battery 12 is recharged to about 6.7 volts.

Figure 4:
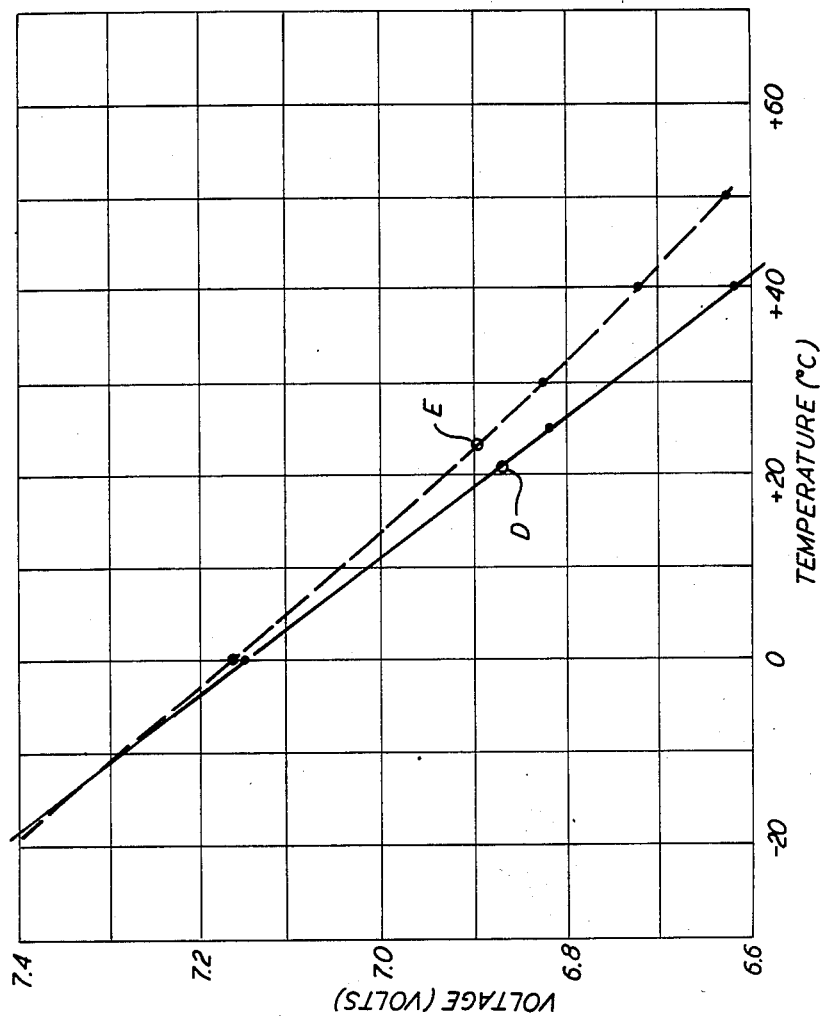
FIG. 4 is a graphic representation, not drawn to scale, comparing the temperature versus voltage characteristics of a typical rechargeable battery with the same characteristics of the apparatus shown in FIG. 1, respectively.

Further, the overall temperature coefficient of the means 14 is equal to the sum of the temperature coefficients of the constituent elements, i.e., the diodes, 20 and 22, and is equal to about $-1.6 + (6)(1.9) = -1.6 + -11.4 = -13$ mV/° C. This matches quite closely with the $-12$ mV/° C. temperature coefficient of the rechargeable battery 12. The comparision of the effect of temperature on the fully charged voltage of the battery and the means 14 is shown by the graphs of FIG. 4. Therein, the curve D is a plot of the variation of the conduction voltage of the means 14 and the curve E is a plot of the variation of the rated fully charged voltage of the rechargeable battery 12 versus temperature. These curves are based on a trickle charge current, $i_c$, of about 2.5 milliamps.

From the above, it is clear that the means 14 begins conducting a portion ($i_d$) of the trickle charge current, $i_c$, when the rechargeable battery 12 is about 0.5 volt below the fully recharged voltage thereof regardless of the ambient temperature. Further, as seen from the forward conduction curves of the diodes 22, the means 14, at the fully recharged voltage of the rechargeable battery 12, conducts substantially completely all of the trickle charge current, $i_c$, provided by the current source 16. As a result, when the rechargeable battery 12 is effectively fully recharged no further significant charging current passes therethrough. Hence, overcharging of the battery 12 is clearly avoided regardless of the ambient temperature.

The present apparatus 10 is advantageous since in many applications the current source 16 supplies a continuous current. Thus, the apparatus 10 eliminates the need for complex switching devices and circuits. That is, since substantially completely all of the trickle charge current, $i_c$, flows through the means 14 when the battery 12 is effectively fully charged, there is no need to disable the current source 16 after recharging the battery 12. This is further advantageous since, when the rechargeable battery 12 is discharged through, for example, the intermittent use thereof, the trickle charge current, $i_c$, is immediately available for the recharging thereof without requiring some external control means to switch on the trickle charge current.

In one particular application the rechargeable battery 12 is adapted to provide power to a remote meter reading subscriber premises unit such as that described and discussed in U.S. Patent Application Ser. No. 774,780 filed on Sept. 11, 1985 and entitled INFORMATION COLLECTING AND FORWARDING APPARATUS. The above-identified application is assigned to the assignee hereof and incorporated herein by reference. Therein an apparatus is described that is remotely located from the controller thereof and is adapted to be connected to a subscriber's telephone line. The telephone line, under normal operating conditions, has a voltage impressed thereon by the telephone company's central office battery. Hence, a continuous current is available for the apparatus 10. However, the magnitude of the current drawn from the subscriber line is usually regulated and, in general, is limited to between about 1 to 4 milliamperes.

Figure 5:
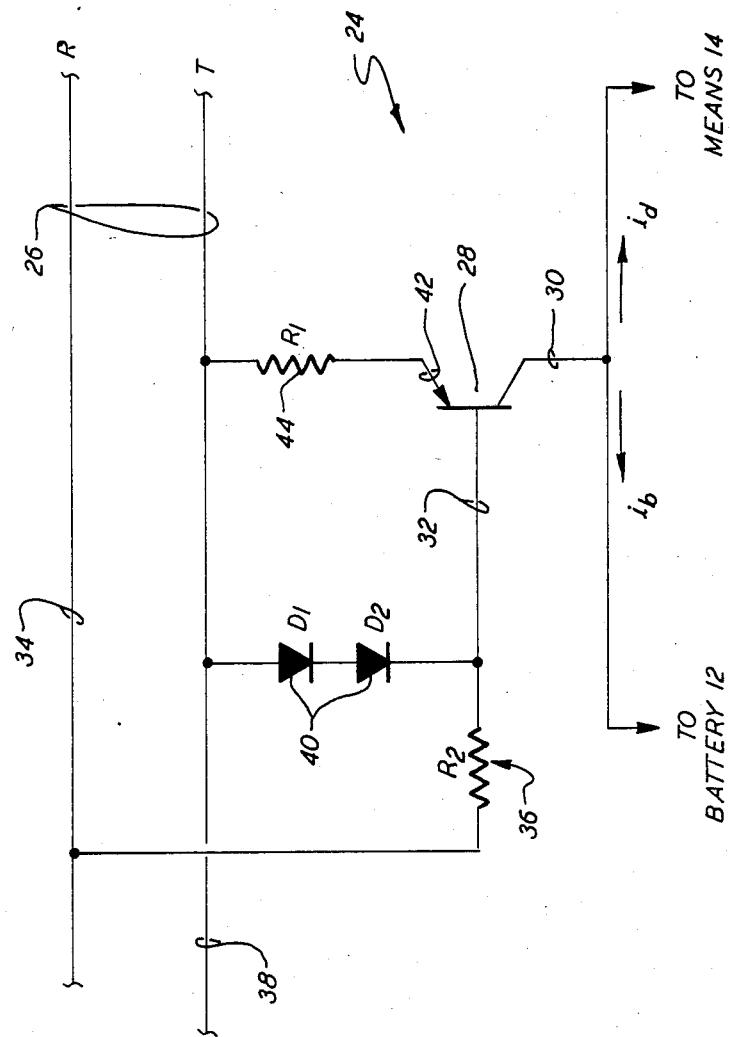
FIG. 5 is a schematic diagram of an exemplary battery charging current source for use with the apparatus shown in FIG. 1.

In this particular applicaton, the current source 16, is, effectively, a current limiter, i.e., a circuit or device that restricts the magnitude of the current passing thereacross. A typical current limiter, generally indicated at 24, is shown in FIG. 5 and is connected across a subscriber telephone line 26. The current limiter 24 includes a transistor 28 having the collector 30 thereof connected to the apparatus 10. The base 32 thereof is connected to the ring wire 34 of the subscriber line 26 via a resistor 36 and to the tip wire 38 of the subscriber line 26 via a pair of series diodes 40. The emitter 42 of the transistor 28 is also connected to the tip wire 38 via a resistor 44. Naturally, many other current limiters are well known and therefore a futher detailed description thereof is not believed necessary for a complete understanding of the present invention.

Although the present invention has been described in regard to a particular embodiment, other configurations and arrangements can also be developed that, nevertheless, do not depart from the scope and spirit of the present invention. Hence, the present invention is deemed limited only by the appended claims and the reasonable interpretation thereof.

What is claimed is:

1. An apparatus for trickle charging a rechargeable battery, said rechargeable battery having a fully charged voltage that varies with the ambient temperature; said apparatus comprises:

means, in parallel with said rechargeable battery, for providing a current path for a trickle charge current from a battery charger current source, said means having an effective impedance that varies inversely to the charge voltage of said rechargeable battery depending on said ambient temperature whereby when said rechargeable battery reaches said fully charged voltage substantially all current drawn from said current source flows through said current path providing means regardless of said ambient temperature, said current path providing means including a plurality of PN junctions, said PN junctions connected in parallel with said rechargeable battery, said plurality of PN junctions includes a first PN juntion having an abrupt reverse biased breakdown voltage, said first PN junction being serially connected to the remainder of said plurality of PN junctions and reverse biased with respect to said rechargeable battery.

2. Apparatus as claimed in claim 1 wherein said battery charging current source is connected to a source of continuous current whereby said current path providing means and said rechargeable battery, as a combination, receive a continuous current.

3. Apparatus as claimed in claim 2 wherein said battery charging current source is a current limiter.

4. Apparatus as claimed in claim 3 wherein said continuous current source is a subscriber telephone line and said current limiter is connected across the tip and ring wires thereof.

5. Apparatus as claimed in claim 1 wherein said current path providing means includes:

means for preventing current flow therethrough until said rechargeable battery reaches a preselected voltage.

6. Apparatus as claimed in claim 5 wherein said preselected voltage varies with said ambient temperature of said rechargeable battery.

7. Apparatus as claimed in claim 6 wherein said preselected voltage is less than the fully recharged voltage of said rechargeable battery.

8. Apparatus as claimed in claim 1 wherein said first PN junction is a zener diode.

9. Apparatus as claimed in claim 1 wherein said plurality of PN junctions further includes:

a number of second PN junctions, said second PN juntions being in series with each other and with said first PN junction and forward biassed with respect to said rechargeable battery.

10. Apparatus as claimed in claim 8 wherein said number of forward biassed PN junctions is a number of forward biassed diodes and said reverse biassed PN junction is a zener diode.

11. Apparatus as claimed in claim 10 wherein said number of forward biassed diodes is selected such that the sum of the forward conduction voltages added to the reverse breakdown voltage of said zener diode is less than said fully charged voltage of said rechargeable battery regardless of the ambient temperature thereof.

12. Apparatus as claimed in claim 1 wherein said current path providing is located proximate said rechargeable battery whereby said current providing means is exposed to the same ambient as said rechargeable battery.

* * * * *